United States Patent [19]

Shutov et al.

[11] Patent Number: 5,415,354
[45] Date of Patent: May 16, 1995

[54] SOLID STATE SHEAR EXTRUSION PULVERIZATION

[75] Inventors: Fyodor Shutov, Downers Grove; George Ivanov, Chicago; Hamid Arastoopour, Darien, all of Ill.

[73] Assignee: Illinois Institute of Technology, Chicago, Ill.

[21] Appl. No.: 101,468

[22] Filed: Aug. 2, 1993

Related U.S. Application Data

[63] Continuation of Ser. No. 981,161, Nov. 24, 1992, abandoned, which is a continuation-in-part of Ser. No. 971,147, Nov. 3, 1992, abandoned.

[51] Int. Cl.$^6$ ............................................. B02C 23/00
[52] U.S. Cl. ........................................ 241/16; 241/17; 241/23; 366/85; 366/88; 366/89
[58] Field of Search ................. 241/16, 17, 23, 60, 241/65, 260.1, 261; 264/211.18, 211.23; 425/204, 208, 379.1; 366/83, 84, 85, 88, 89

[56] References Cited

U.S. PATENT DOCUMENTS

| | | | |
|---|---|---|---|
| 3,102,716 | 9/1963 | Frenkel | 366/88 |
| 3,104,420 | 9/1963 | Selbach | 366/88 X |
| 3,164,375 | 1/1965 | Frenkel | 366/89 X |
| 3,525,124 | 8/1970 | Ocker . | |
| 3,728,053 | 4/1973 | Stillhard et al. | 425/208 X |
| 3,814,566 | 6/1974 | Stroup | 425/371.1 X |
| 3,874,835 | 4/1975 | Rossiter et al. | 241/60 X |
| 3,889,889 | 6/1975 | Sawa . | |
| 4,041,115 | 8/1977 | Jenkins et al. . | |
| 4,090,670 | 5/1978 | Bennett . | |
| 4,098,463 | 7/1978 | Lowry . | |
| 4,118,163 | 10/1978 | Lee | 366/88 X |
| 4,181,647 | 1/1980 | Beach | 366/89 X |
| 4,184,772 | 1/1980 | Meyer | 366/89 X |
| 4,367,190 | 1/1983 | Beach | 425/208 X |
| 4,408,888 | 10/1983 | Hanslik | 366/89 X |
| 4,511,091 | 4/1985 | Vasco . | |
| 4,607,796 | 8/1986 | Enikolopov et al. . | |
| 4,607,797 | 8/1986 | Enikolopow et al. . | |
| 4,650,126 | 3/1987 | Feder et al. . | |
| 4,708,617 | 11/1987 | Herrington | 425/208 X |
| 4,716,000 | 12/1987 | Kerschbaum et al. | 425/208 X |
| 4,875,847 | 10/1989 | Wenger et al. . | |
| 4,890,996 | 1/1990 | Shimizu . | |
| 4,968,463 | 11/1990 | Levasseur . | |
| 4,997,137 | 3/1991 | Tolonen | 241/260.1 X |
| 5,026,512 | 6/1991 | Chang . | |
| 5,073,320 | 12/1991 | Stenzel | 264/211.23 X |
| 5,088,191 | 2/1992 | Brambilla | 366/88 X |

FOREIGN PATENT DOCUMENTS

| | | |
|---|---|---|
| 9114552 | 10/1991 | European Pat. Off. . |
| 2196242 | 3/1974 | France . |
| 3332629 | 3/1985 | Germany . |
| 4021550 | 1/1991 | Germany . |
| 4130315 | 1/1993 | Germany . |
| 334404 | 1/1959 | Switzerland . |
| 456937 | 7/1968 | Switzerland . |
| 1184717 | 1/1970 | United Kingdom . |

OTHER PUBLICATIONS

Nikolai S. Enikolopian, "Some Aspects of Chemisty and Physics of Plastic Flow", Pure & Appl. Chem., vol. 57, No. 11, pp. 1707–1711, (1985).

Amer. Inst. Chem. Engrs; 1992 Annual Meeting, Nov. 1–6, 1992 Thermoplastic Waste Recycling Process Using Soid State Shear Extrus. Extended Abstracts, p. 441, Abstract No. 187e.

*Primary Examiner*—Frances Han
*Attorney, Agent, or Firm*—Speckman, Pauley & Fejer

[57] ABSTRACT

A process and apparatus for pulverization of natural and synthetic polymeric material by heating to a premelt or softening temperature below its melting point, cooling and applying high normal and shear stresses sufficient to form fine powder, and fluidizing the powder in a gas stream preventing its agglomeration. The same process and apparatus is suitable for enhancement of reactivity of polymeric and solid monomeric material to form homopolymers, copolymers, and new polymeric materials.

19 Claims, 2 Drawing Sheets

SOLID STATE SHEAR EXTRUSION PULVERIZATION

This application is a continuation of application Ser. No. 07/981,161, filed Nov. 24, 1992, now abandoned which is a continuation-in-part of application Ser. No. 07/971,147, filed Nov. 3, 1992 now abandoned.

BACKGROUND OF THE INVENTION

1. Field of the Invention

This invention relates to a solid state shear extrusion process and apparatus for continuous pulverization to fine particles of a wide variety of solids and their mixtures, such as, polymers, copolymers, homopolymers, agrowastes, rubber, wood chips, and mixtures of synthetic and natural polymers which have been resistant to such fine pulverization. The optimum conditions will be apparent to one skilled in the art. The process and apparatus of this invention is especially useful for recycling of synthetic and natural polymers and mixed polymer wastes using a non-cryogenic and low power consumption technique.

2. Description of Related Art

Currently, three basic reclaiming processes of virgin and used plastics are practiced: Chemical, which include pyrolysis, hydrolysis, and incineration; Thermal, which, for example, include extrusion, injection molding, and pressure molding; and Mechanical, which include granulation, densification, agglomeration, and pulverization. Presently used processes have disadvantages of high energy consumption, decrease in original properties of the polymers, applicability to only specific polymers, and environmental undesirability.

U.S. Pat. No. 4,090,670 teaches recovery of rubber from scrap vulcanized rubber tires by raising the surface temperature sufficiently to devulcanize followed by removal of the devulcanized material, such as by rasping. This method is limited to rubber and does not produce fine powders as desired for many reuse applications.

Reclamation of thermoplastic materials including shredding, grinding and comminuting is exemplified by: U.S. Pat. No. 4,968,463 teaching shredding waste plastic to about 100 mm and grinding to under about 40 mm, followed by drying, preheating to 80° to 160° C., kneading at 120° to 250° C. and injection molding or extrusion; U.S. Pat. No 4,650,126 teaching heating plastic particles to melt the surface to retain a grinding aid thereon and maintaining a counter-rotating attrition mill at a temperature to retain nearly all of the grinding aid on the softened polymer particles during grinding, followed by an air stream which serves to separate the grinding aid and as a material carrier medium; U.S. Pat. No. 4,511,091 teaching thermoplastic scrap recovery combined with phonograph record pressing wherein the hot trimmed waste is cooled, ground, and mixed with virgin material for formation of phonograph records; and U.S. Pat. No. 4,098,463 teaching a liquid cooling spray to maintain the temperature in a cutting chamber such that the plastic is hard which reduces the fibers imbedded in the comminuted particles from plastic electrical or telephone cord insulation.

Various screw devices are known for conveyance and processing in the synthetic polymer industry. Molding of products from a mixture of thermoplastic polymers or a thermoplastic polymer and an inorganic material by control of crystallization in a screw extruder with temperature control in a first portion within 35° C. below the material melting point and the temperature in a second portion within 35° C. above the material melting point with the maximum temperature at the outlet is taught by U.S. Pat. No. 5,026,512. U.S. Pat. No. 4,890,996 teaches continuous granulating by melting, kneading and granulating macromolecules wherein a double screw kneader without lateral communication is capable of adjusting the degree to which material is kneaded by axial adjustment of the cylinders and screws with respect to each other.

Conical screw sections are known to be used for specific purposes. U.S. Pat. No. 4,875,847 teaches a twin screw extruder, especially suited for viscous materials, having frusto-conical screw sections and separate barrel sections at the outlet end providing bearing-type support for the separate screws. U.S. Pat. No. 3,525,124 teaches an extracting apparatus having screw-threaded shafts rotatable within a housing and having conveying and milling sections with an obstruction section between for pressure sealing. The screw and the housing may be tapered to form the obstruction section, thereby providing independent heat and pressure control in the conveying and milling sections.

Chemical and Physical aspects of transformations of polymeric materials, such as pulverization, under simultaneous high pressure and shear is described in Nikolai S. Enikolopian, "Some Aspects of Chemistry and Physics of Plastic Flow", Pure & Appl. Chem., Vol. 57, No. 11, pp. 1707–1711, (1985).

U.S. Pat. No. 4,607,797 teaches pulverization of fused polymers in an extrusion apparatus having a barrel with at least one cylindrical rotatable screw. When two screws are used, they are co-rotational. The '797 patent teaches that material is fed to one end of the barrel, heated to above its fusing temperature in a first zone, cooled to below its solidification temperature with simultaneous pre-crushing and pulverizing of the solidified material in a second zone, and discharge of the powdered material from the opposite end of the barrel. Screw action is used to convey the material through the barrel and substantially elliptical or triangular kneading or pulverizing discs non-rotatably mounted on the screw in the cooling zone provide the pre-crushing and pulverizing. The process is carried out at 0.25 to 0.30 MPa. This process is said to continuously produce particles having a very uniform grain size, in the case of polyethylene only 2% larger than 160 microns. The '797 patent distinguishes its process from the prior art by allowing solidification of the fused material within the extrusion apparatus.

U.S. Pat. No. 4,607,796 teaches pulverization of rubber and vulcanization products in a standard single- or multiple-screw extruder by compressing at a pressure of 0.2 to 0.7 MPa, then subjecting the compressed material to a shear force of 0.03 to 5 N/mm$^2$ at a pressure of 0.2 to 50 MPa and temperature of 80° to 250° C. forming hot sheared material which is subjected to a shearing force of 0.03 to 5 N/mm$^2$ at a pressure of 0.2 to 50 MPa and temperature of 15° to 60° C. forming cooled powder material. Addition of granulated polyethylene to butyl rubbers is necessary to obtain finely dispersed powders. This process is said to result in particles not exceeding 500 micrometers in the case of natural rubber and 300 micrometers with other rubbers.

SUMMARY OF THE INVENTION

Natural and synthetic polymer wastes are increasing and environmental concerns about their disposition render recycling necessary. However, many reclamation processes to date have been limited to certain types of wastes and particularly limited with respect to mixed wastes, have been uneconomical, particularly with respect to energy consumption, and have not provided reclaimed material in a form conducive to re-use manufacturing. Solid state shear extrusion pulverization according to this invention requires low energy input, about one fifth the energy required in presently used cryogenic pulverization, and provides finer and more uniform powders, than presently known pulverization techniques known to the inventors, which may be used in a broader range of re-use or end use manufacture.

It is one object of this invention to provide a low energy consumption process and apparatus for pulverization of polymeric materials to fine powders.

It is another object of this invention to provide a process and apparatus for pulverization of a wide variety of natural and synthetic polymeric materials to form a fine powder.

Yet another object of this invention is to provide a process and apparatus suitable for economical recycling of a wide variety of natural and synthetic polymer wastes, including mixed wastes, by solid state shear extrusion pulverization of such waste materials forming fine powders suitable for use in new product production.

Another object of this invention is to provide fine polymeric particles for coating and preservation of stone and concretes, such as used in monuments, buildings, and bridges, and concrete pipes and materials exposed to corrosive environments. The object is to provide a substitute for liquid paints and coatings based upon organic non-environmentally friendly solvents with fine particles coatings which are more durable, stable and environmentally safe when applied to surfaces, especially metal and porous mineral surfaces.

Still another object of this invention is to provide a process and apparatus to enhance reactivity of polymeric and solid monomeric materials in the formation of homopolymers, copolymers and polymeric materials not achievable by prior methods of reaction.

These and other objects and advantages of the invention are achieved by heating the polymeric material to a softening or pre-melt temperature below its melting point, cooling the material and applying high normal and shear forces sufficient to form fine powder of the polymeric material, and fluidizing the fine powder with further cooling in a gas stream thereby preventing its agglomeration in materials having tendency to agglomerate. The heat applied to the materials decreases the physical bonds between macromolecules and enhances mechanical deformations. Suitable forces may be applied by application of torque up to about 20 MKg and pressure up to about 150 psig. Fine powders having particles sized about 5 to about 350 microns have been produces, the value average range being about 50 to about 100 microns.

The process of this invention may be carried out on a continuous basis in a solid state shear extrusion pulverizer having a hollow generally converging barrel housing a generally converging twin screw extruder having generally converging conical meshing screws in at least the powder formation zone. Feed means are provided to feed polymeric material to a first zone at one end of the barrel and discharge means are provided for removal of pulverized powder from a fourth or expanding zone at the opposite end of the barrel. The materials screw feed in the first zone. Heating means are provided for heating the polymeric material to a pre-melt or softening temperature in the second zone. Suitable pre-melt or softening temperatures are those at which the material is softened and can be shaped by the extruder but not melted. These temperatures depend upon the polymer materials used and are readily ascertained by one skilled in the art. For most polymeric materials, heating to about 100° to about 200° C. and below the melting point of the polymer is suitable. Cooling means are provided for cooling the polymeric material from the pre-melt temperature to temperatures below the softening point of the material in a third zone adjacent the second zone. The temperature to which the material is cooled is again dependent upon the polymeric materials used and will be readily ascertained by one skilled in the art. For most polymeric materials, cooling to about 30° to about 80° C. is suitable. Means for applying high normal and shear forces sufficient to form fine powders are provided in a third zone located between the second and fourth zones. Means are provided for fluidizing and further cooling the fine powder in a gas stream preventing its agglomeration in the latter portion of the third zone and in the fourth zone. Increase of the barrel diameter and increase in distances between the screw flights in the fourth zone contribute significantly in preventing agglomeration of materials and final production of fines.

The solid state shear extrusion pulverization process and apparatus of this invention provides continuous very fine pulverization, to average particle size of less than about 100 microns, of polymeric materials which have been recalcitrant to fine pulverization by prior processes and apparatus. The process of this invention utilizes low pressure and temperatures closer to ambient than prior processes with the major amount of supplied energy to the process being utilized to create normal and shear stresses on the particles to result in the very fine powder with low energy input. A significant amount of the energy required for pulverization to the very fine powder is produced by creating thin film from pre-melt temperature particles and cooling this film resulting in very high shear and normal stresses by the "Bridgeman" effect. The process and apparatus of this invention are applicable to a variety of polymers, such as, low density polyethylene, rubber, mixtures of low density polyethylene and rubber, and low density polyethylene and wood, and copolymers. The fine polymeric powder produced by the process and apparatus of this invention enables much broader end uses as fillers and reinforcement agents in many types of matrices, such as polymer, ceramic, gypsum, concrete, and asphalt. This is important to practical utilization of products of recycling polymer wastes, both pre- and/or post-consumer, to reduce the environmental problems caused by such solid wastes.

BRIEF DESCRIPTION OF THE DRAWING

The above objects and further advantages of the invention will be apparent upon reading the preferred embodiments and reference to the drawing, wherein.

DESCRIPTION OF PREFERRED EMBODIMENTS

In the process of solid state shear extrusion pulverization according to this invention, polymeric granules, flakes or shreds of virgin or used synthetic or natural polymer, copolymer and homopolymer materials, or a mixture of such materials, are fed by any suitable feed means to a first zone at the large end of a hollow generally converging barrel housing a generally converging twin screw extruder having generally converging conical meshing screws. By the terminology "generally converging" it is meant that the cross section of the feed ends of the barrel and the screws are larger than the opposite discharge ends and in the powder formation zone, the convergence is continuous, forming conical screws in at least that zone. This terminology is intended to allow a larger shaped end section and smaller central sections, for example to accommodate bearing means. Generally, the screws may be cylindrical in the feed zone, have a definite conical convergence in the powder formation zone, and provide an expansion cross sectional area in the fourth or fluidizing zone. In preferred embodiments, continuously converging conical screws are used for the entire length of a barrel having converging walls in the powderization zone followed by diverging walls in the cooling/nonagglomerating zone.

Figure 1:
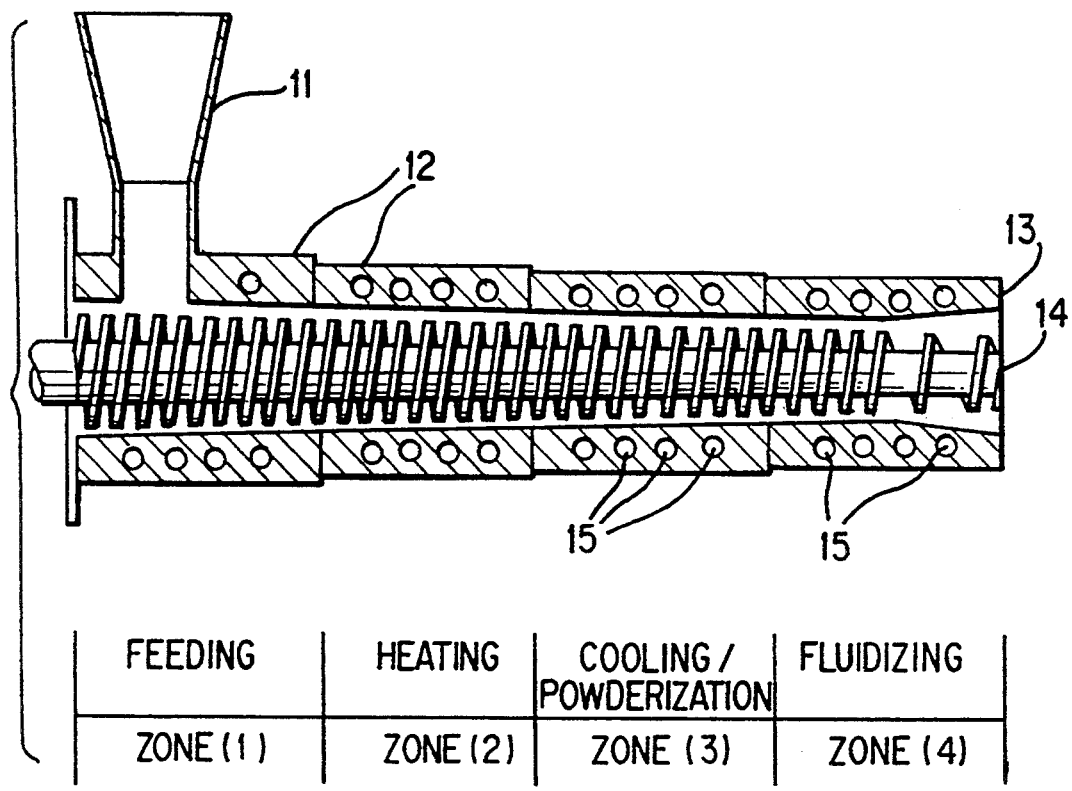
FIG. 1 is a longitudinal sectional view showing four zones of a conical counter-rotating screw apparatus according to one embodiment of this invention.
Figure 2:
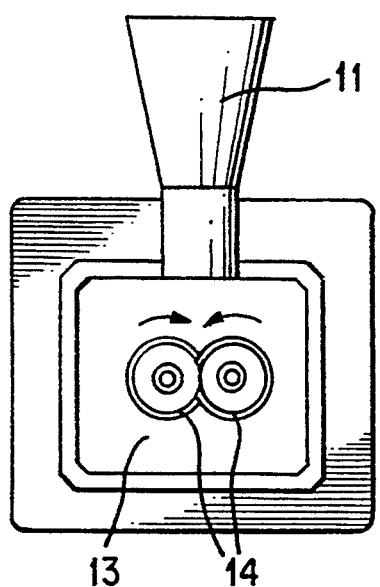
FIG. 2 is an end view of the apparatus shown in FIG. 1.

FIG. 1 is a longitudinal sectional view of an apparatus according to this invention showing feed hopper 11 for feeding polymer materials to feeding zone 1 within barrel 13 housing screws 14. Heaters 12 are provided in barrel walls in the region of heating zone 2. Cooling conduits 15 are provided in barrel walls in the region of cooling/powderization zone 3 and may be provided in the region of cooling/nonagglomerating zone 4. Increase in the diameter of the barrel opening in cooling-/nonagglomerating zone 4 is shown. Also, increase in spacing of the flights on screw 14 in cooling/nonagglomerating zone 4 is shown. FIG. 2 shows the counter rotation of screws 14 within barrel 13.

The polymeric feed material may be fed to the first zone in a size range equal or less than the distance between screw flights and their depths, preferably about 1 mm to about 6 mm. Size reduction to these dimensions may be achieved by many methods known to the art. Suitable polymeric materials include polyethylene terephthalate, high-density polyethylene, low-density polyethylene, polypropylene, polyvinyl chloride, styrenes, acrylics polycarbonates, polyamides, polyurethanes, rubber, and natural polymers such as wood and corn. Mixtures of these materials or composites may be used. When materials recalcitrant to fine pulverization are present alone, it is desirable to form a mixture of such materials with at least one material which is readily pulverized to the desired fine particles by the process of this invention. Minor amounts of readily pulverized materials, about 5 to about 50 volume percent, depending greatly upon the materials, may be mixed with such recalcitrant materials to result in fine powder formation according to this invention. To accommodate recycling of waste polymeric materials, it may be desirable to have present minor amounts, up to about 30 volume percent, of pulverizable materials.

Heating means capable of heating the polymeric material in the second or heating zone to a softening or pre-melt temperature which is below its melting point are located in a suitable manner to achieve the desired temperature, at which a small shear stress may result in high deformation. Any suitable heating means known to the art may be used, for example, the barrel may be electrically heated or a fluid heating jacket surrounding the barrel may be used in this region. In the second or heating zone where heating to a pre-melt temperature takes place, the meshing screws serve primarily to convey the material through the zone with an appropriate residence time to achieve the desired heating prior to entry to an adjacent cooling/powderization zone.

Figure 3:
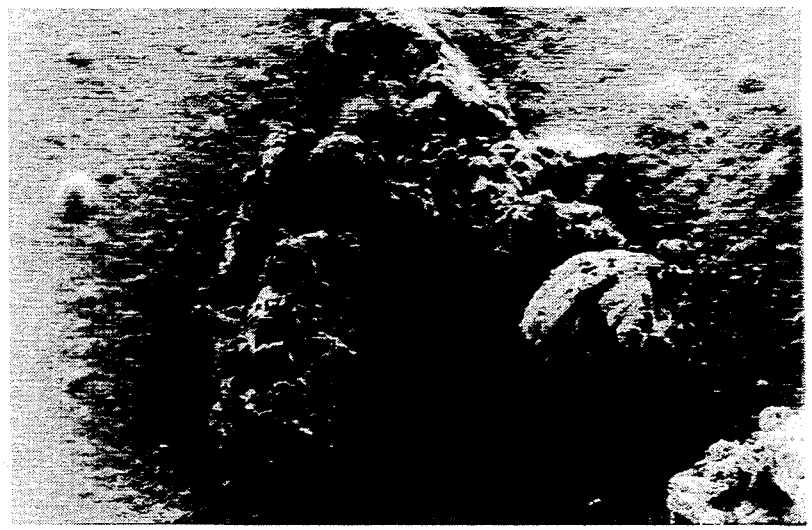
FIG. 3 is a scanning electron micrograph of rubber powder with particle size about 20 microns obtained according to this invention from used automobile tires.

Cooling means capable of cooling the pre-melt polymeric material in the third or cooling/powderization zone to a temperature below the softening temperature of the material are located in a suitable manner to achieve the desired temperature. Any suitable cooling means known to the art may be used, for example, a fluid cooling jacket surrounding the barrel, liquid nitrogen, dry ice, or the like, may be used in this region. In the early portion of the length of the third zone where cooling from the higher temperature takes place, the meshing screws serve primarily to convey and material through this region with an appropriate residence time to achieve the desired cooling. Cooling in the third zone forms thin solid film material and imparts very high normal and shear stresses in the thin film material. A pressure of about 0 to about 150 psig may be maintained in this portion of the barrel. Concurrently with formation of these high normal and shear stresses in the material in the third zone and in an adjacent fourth zone, it is desired that the meshing screws be conically shaped and mated to provide additional normal and shear stresses to the material sufficient to form fine powder. In preferred embodiments, the average fine powder particle sizes are less than about 70 microns. FIG. 3 is a scanning electron micrograph of rubber powder having particle size of about 20 microns produced according to this invention from used automobile tires.

The conically shaped meshing screws must be designed to provide sufficient residence time for formation of powder from a substantial portion of the material in the third zone and to provide necessary stresses to the material to achieve formation of the very fine powder of the above defined sizes. We have found that the conical shape and counter-rotation of the screws aid in imparting desired high stresses to the polymeric material. Drive means as known to the art are provided to rotate the opposing screws at about 4 to about 90 RPM, preferably about 8 to about 75 RPM.

The very fine powder is passed to the fourth zone where the cross sectional open area barrel is expanded and gas introduced sufficient to fluidize the powder to prevent agglomeration and to convey the powder through a discharge means in the fourth zone. Any gas which is not chemically reactive with the powder material may be used as a fluidizing gas. Air at ambient temperature is a preferred fluidizing gas which additionally cools the powder. The fluidizing gas may be introduced to the hollow barrel in the third and fourth zones by any suitable method known to the art. The cross sectional open area may be suitably expanded by reduction of the cross sectional area of the screw, increase in distance between flights of the screw, or by reduction of the taper or actual divergence of the barrel housing. The fluidized very fine powder may be discharged from a suitable opening in the barrel housing.

The aspect of this invention relating fluidizing pulverized powder in a gas stream following pulverization to prevent its agglomeration is applicable to any process for solid state pulverization by shear extrusion. The fluidizing is carried out in an expanding volume which may be provided by a diverging chamber and by providing larger distances between flights of a screw passing through such a fluidized zone. It is further desired that the fluidized powder is cooled in an expanding volume zone. These features aid in expanding the powder from a packed bed condition to a fluidized bed condition releasing forces from the contacting particles and basically float them, significantly preventing agglomeration.

The process and apparatus has been described with emphasis on synthetic and natural polymer recycling. The same process and apparatus may also be used to enhance reactivity of polymeric and solid monomeric materials. Under the conditions of pressure and shear to form very fine powders, as described above, the coefficients of diffusion and mass transfer increase by several orders of magnitude and new properties are imparted to the material. Thus, at the moment of shear, reactions of polymerization, polycondensation, polyaddition with formation of high molecular weight compounds takes place as more fully described in the article by Nikolai S. Enikolopian, Supra., incorporated herein by reference in its entirety. The reactions as described by Enikolopian are enhanced by use of the conical meshing screws in the powder formation zone, as described in this invention. The process for enhancement of reactivity of polymeric and solid monomeric materials is conducted by heating the material to a pre-melt temperature, cooling the material and applying high normal and shear forces sufficient to form fine powder. Homopolymers, copolymers and new polymeric materials may be formed by use of the process and apparatus of this invention.

The following specific examples are set forth using specific materials, apparatus and process conditions, to further explain the invention and should not be considered to limit the invention in any way.

EXAMPLE I

Rubber granules from used automobile tires of 6 mm in size were fed to the first zone at the large end of a continuously converging barrel housing two continuously converging conical shaped non-modular screws, as shown in FIG. 1. The conical screws had a length of 14 inches and diameter range of 1.67 to 1 inch and were driven by a geared electric motor in counter rotation at 77 RPM. The pressure within the barrel was less than 0.07 MPa in the heating zone and atmospheric in the cooling-powder formation zone. Torque was between 1.5 and 2.5 MKg. The temperature at the barrel in the heating zone was maintained at 220° C. in the first portion and 180° C. in the latter portion using electric heaters to heat the rubber to the desired temperature. Cooling was provided to zone 3 by chilled water jackets surrounding the barrel housing and cool air was added to zone 4 to fluidize and cool the powdered rubber to 50° C. at the barrel wall. FIG. 3 is a scanning electron micrograph of the smallest rubber powder produced by the process.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A process for solid state shear extrusion pulverization of a polymeric material selected from the group consisting of rubber and natural polymers comprising; heating said polymeric material, then cooling said polymeric material and applying normal and shear forces sufficient to form powder of said polymeric material, and fluidizing said powder in a gas stream.

2. A process for solid state shear extrusion pulverization according to claim 1 wherein said applying of high normal and shear forces is conducted by conically shaped counter-rotating meshing screws rotated at about 4 to about 90 RPM.

3. A process for solid state shear extrusion pulverization according to claim 2 wherein up to about 20 MKg torque is applied.

4. A process for solid state shear extrusion pulverization according to claim 1 wherein said polymeric material is heated to about 100° to about 220° C.

5. A process for solid state shear extrusion pulverization according to claim 1 wherein said polymeric material is cooled to about 30° to about 80° C.

6. A process for solid state shear extrusion pulverization according to claim 1 wherein said gas stream is at a lower temperature than said powder thereby further cooling said powder.

7. A process for solid state shear extrusion pulverization according to claim 1 wherein said powder has average particle sizes of about 50 to about 100 microns.

8. A process for solid state shear extrusion pulverization according to claim 1 wherein said polymeric material is selected from the group consisting of synthetic polymers and natural polymers.

9. A process for solid state shear extrusion pulverization according to claim 1 wherein said natural polymers are selected from the group consisting of wood and corn.

10. A process for solid state shear extrusion pulverization according to claim 1 wherein said fluidizing said powder is said gas stream provides expansion of the fluidized powder by expanding the cross sectional open area between said meshing screws and a barrel housing said meshing screws.

11. A process for solid state shear extrusion pulverization according to claim 1 wherein said fluidizing said powder in said gas stream provides expansion of the fluidized by increase in distance between flights of said meshing screws.

12. A process for solid state shear extrusion pulverization of rubber comprising; heating said rubber to about 100° to about 220° C., cooling said rubber to about 30° to about 80° C. and applying normal and shear forces by conically shaped counter-rotating meshing screws.

13. A process for solid state shear extrusion pulverization of rubber according to claim 12 wherein said counter-rotating meshing screws rotate at about 4 to about 90 RPM.

14. A process for solid state shear extrusion pulverization of rubber according to claim 12 wherein up to about 20 MKg torque is applied.

15. A process for solid state shear extrusion pulverization of rubber according to claim 12 wherein said fine powder is fluidized in a gas stream for removal from said screws.

16. A process for solid state shear extrusion pulverization of rubber according to claim 15 wherein said gas stream is at a lower temperature than said powder.

17. A process for solid state shear extrusion pulverization of rubber according to claim 15 wherein said fluidizing in said gas stream provides expansion of the fluidized powder by expanding the cross sectional open area between said meshing screws and a barrel housing said meshing screws.

18. A process for solid state shear extrusion pulverization of rubber according to claim 15 wherein said fluidizing said powder is said gas stream provides expansion of the fluidized powder by increase in distance between flights of said meshing screws.

19. A process for solid state shear extrusion pulverization of rubber according to claim 12 wherein said rubber is heated to about 180° to about 220° C.

* * * * *